United States Patent [19]

Landau

[11] Patent Number: 5,745,340
[45] Date of Patent: Apr. 28, 1998

[54] SEPARABLE DISPLAY OF COMPUTER GENERATED INFORMATION

[76] Inventor: Jennifer Landau, 219 E. 5th St. Apt. 7, New York, N.Y. 10003

[21] Appl. No.: 358,838

[22] Filed: Dec. 19, 1994

[51] Int. Cl.⁶ .............................. H05K 7/10; G06F 1/16
[52] U.S. Cl. .......................... 361/681; 361/683; 345/1; 345/2; 345/3; 345/30; 345/31; 345/173
[58] Field of Search ..................... 345/1-3, 7, 48, 345/102, 156, 168, 169, 173, 185, 201, 211, 30, 31; 361/679, 681, 682, 683, 684; 362/31; 340/825.17

[56] References Cited

U.S. PATENT DOCUMENTS

| | | | |
|---|---|---|---|
| 4,924,215 | 5/1990 | Nelson | 345/102 |
| 5,041,965 | 8/1991 | Chen | 345/7 |
| 5,196,993 | 3/1993 | Herron et al. | 361/393 |
| 5,233,502 | 8/1993 | Beatty et al. | 361/681 X |
| 5,237,488 | 8/1993 | Moser et al. | 361/681 X |
| 5,262,759 | 11/1993 | Moriconi et al. | 361/681 |
| 5,433,620 | 7/1995 | Kobayashi | 439/165 |
| 5,479,183 | 12/1995 | Fujimoto | 345/3 |
| 5,590,021 | 12/1996 | Register | 361/681 |

*Primary Examiner*—Raymond J. Bayerl
*Assistant Examiner*—Seth D. Vail
*Attorney, Agent, or Firm*—George E. Kersey, Esq.

[57] ABSTRACT

Method and apparatus for displaying information by providing a flat-panel display module with display information, separating the flat-panel display module from information source and locating the module, without being inverted, at a specified position physically displaced from the source. The separated display module can be operated with or without connection to the source, and the module can be transported away from the source to provide a portable data store which can be accessed independently of the source. The module can be back-lighted and positioned alongside a keyboard of the source, and the separated display can be operated simultaneously with another flat-panel display.

15 Claims, 8 Drawing Sheets

SEPARABLE DISPLAY OF COMPUTER GENERATED INFORMATION

This invention relates to the display of information, and more particularly to the display of information with personal computers.

BACKGROUND OF THE INVENTION

Personal computers, including desktop, notebook and laptop types are in increasingly wide use because of their convenience and portability. However, there continue to be many challenges in developing and designing computers which are user friendly and versatile.

One challenge is to develop computers that are adaptable to a wide variety of operating and viewing conditions. This is particularly true for personal computers. For example, a stationary model, such as a desktop computer, is typically used at a single location under relatively constant lighting conditions, but offices still are not "paperless" and users still are not comfortable reading from the ordinary screen. Portable computers must be usable under a variety of lighting conditions. In some cases, for both desktop and portable computers, it is desirable to have a display that can be positioned in order to take into account user-friendly reading conditions (lighting, screen position, eye-screen position and distance from the reader).

There are many different types of computer displays, including those characterized by "flat panels". Flat panel displays are advantageous because the ordinary Cathode Ray Tube (CRT) displays are bulky, cumbersome and vulnerable to being damaged if attempted to be used portably. Because of the bulk and size of CRT displays they tend to have fixed positions and are difficult to accommodate to user desired changes and orientations. The CRT display requires an elongated tube that is designed to be horizontally positioned and provide a "vertical" display, which may not be suitable for all user requirements.

One type of flat-panel display is of the "transflective" type, with low-intensity back lighting and low magnitude power consumption. The standard monochrome flat-panel display also is back-lighted, but is subject to moderate power consumption. Passive flat-panel color displays, also known as super-twist nematics (STN's), have good visibility and color, but have even higher power consumption. STN's are formed with liquid crystal molecules which can align themselves spontaneously with their molecular axes in parallel.

There are many factors to consider when choosing a display, including visibility under different conditions, availability and range of coloration, and power consumption. Unfortunately, once a computer is chosen it generally comes with a fixed display which may not be suitable for changes in conditions. Even where displays can be interchanged, there can still be the objection that the display may not be convenient for the user. Such is the case with the disclosure in U.S. Pat. No. 5,262,759 ("'759") issued Nov. 16, 1993 in the names of David P. Moriconi and Dan Kikinis on assignment to Cordata Incorporated of Tortola, British Virgin Islands.

In the '759 patent a computer system is disclosed having a body structure that houses and supports computing elements, memory elements and input elements. The display is a removable, flat-panel module with physical and electrical elements for attaching the display module to the body structure of the computer. The attachment is made to a hinged mount of the body structure along a pivot axis. The mount has physical and electrical joining elements corresponding to, and engaging the complementary elements provided on the display module.

Because of the hinging of the mount to the associated body structure, the display is confined to a position along the arc that extends from the fully closed position of the hinge, where the display is folded against the body, to the fully open position where, the angle between the display and the body exceeds ninety degrees. There is no facility for providing any other positions of the display in relation to the base body.

Accordingly it is a principal object of the invention to enhance user compatibility in connection with the use of computer displays.

A related object is to provide for positioning of the display in other than the confined range allowed by the '759 patent, and by desktop models which are even less flexible.

SUMMARY OF THE INVENTION

In accomplishing the foregoing and related objects the invention provides a flat-panel display module which receives display information at a flexible position physically displaced from the unit providing the display information. The display is permitted to be horizontally positioned in relation to said user. The physical displacement of the flat-panel display module from the source of the display information can be by a cable extending from said flat-panel module to the unit providing the display information.

In accordance with one aspect of the invention, the display module can be back-lighted, and be a flat-panel that is slidably engageable with the providing unit in order to permit said module to be disengaged from the providing unit and be positioned at a position physically displaced from the providing unit.

In accordance with another aspect of the invention, the cable, that permits the flat-panel display module to be physically separated from the information providing unit, has opposite ends, one of which terminates in a multi-lead input connected to the providing unit, and the other end terminates in a multi-lead output connected to the display module.

The multi-lead output can form a mating electrical connection for a multi-pin electrical connector mounted in the flat-panel display module, and the multi-lead input be a multi-pin electrical connector for a complementary electrical connection in the providing unit.

The display module is disengageable by a snap-in structure that includes a release for unlocking the flat-panel display from the mounting structure to allow removal to a position displaced from the providing unit.

The invention also provides a computer system for generating display information, accompanied by a first display screen and an auxiliary display screen for displaying the information.

The auxiliary display screen can be a flat-panel display and the other display screen can be a cathode-ray tube display. The generator of the display information can include a multi-lead connector for the first display screen and a duplicate, separate multi-lead connector for the second display screen.

The invention also provides a separate display module, separate from the source of storage information, for continuing the storage of display information in the module and thereafter controlling the display of the stored information. The display module can be a flat-panel device, which is back-lighted and can include a rechargeable battery.

A printer enable outlet of the information source can be used to store the display information in the separate display module.

DESCRIPTION OF THE DRAWINGS

Other aspects on the invention will become apparent after considering several illustrative embodiments, taken in conjunction with the drawings, in which.

DETAILED DESCRIPTION

Figure 1A:
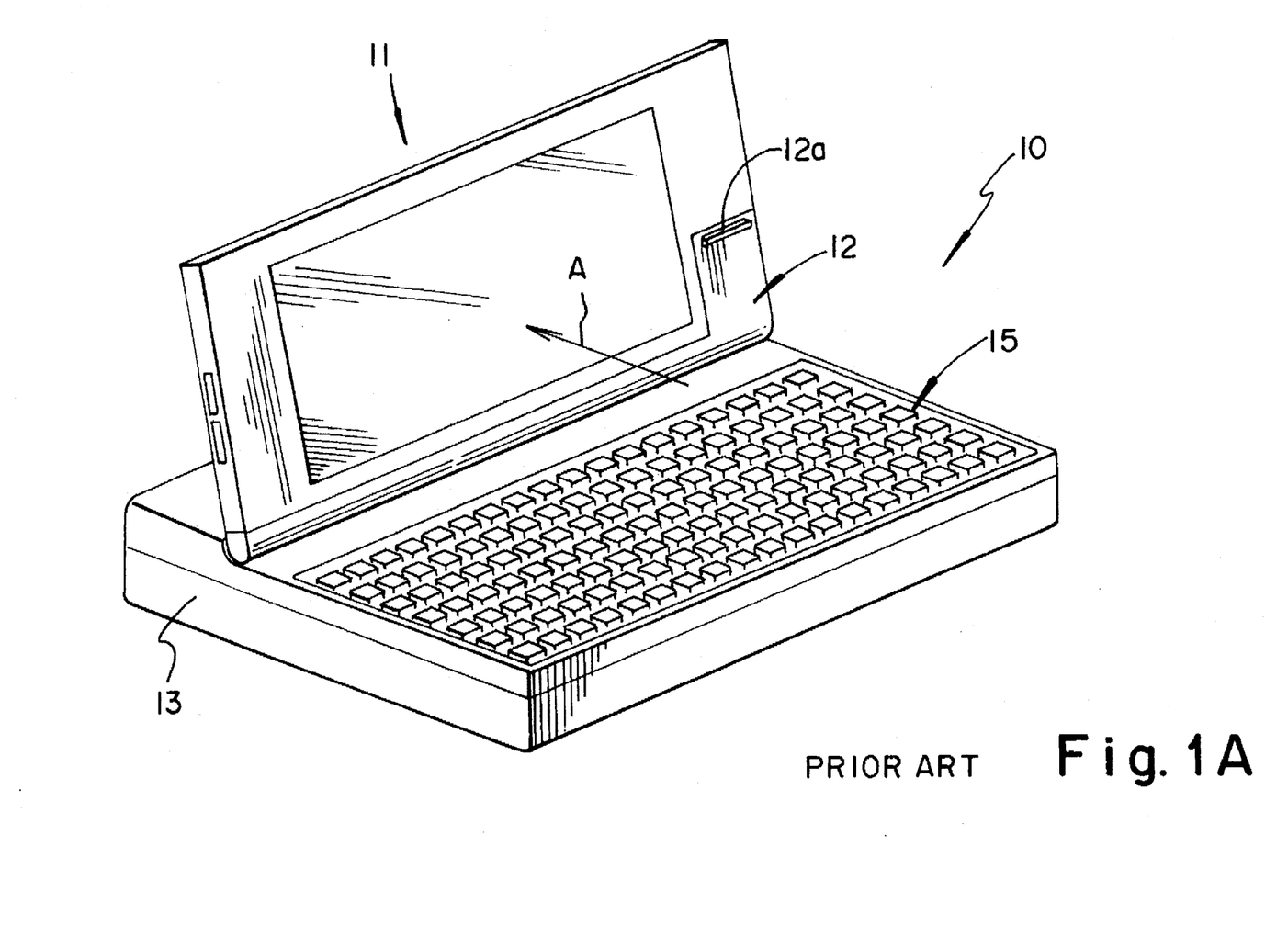
FIG. 1A is an isometric view of a personal computer of the prior art with a removable modular display.

With reference to the drawings, FIG. 1A shows a personal computer 10 of the prior art with a removable, display module 11 connected to a mount 12 that is hinged to the base unit 13 of the computer 10.

The base unit 13 also includes a keyboard 15, and the display module 11 of the computer 10 is shown in its fully "open" position. The module 11 may be rotated to its fully "closed" over the keyboard 15.

The computer 10 has the disadvantage that the position of the module 11 is confined to arc extending from the fully closed to the fully open position.

Figure 1B:
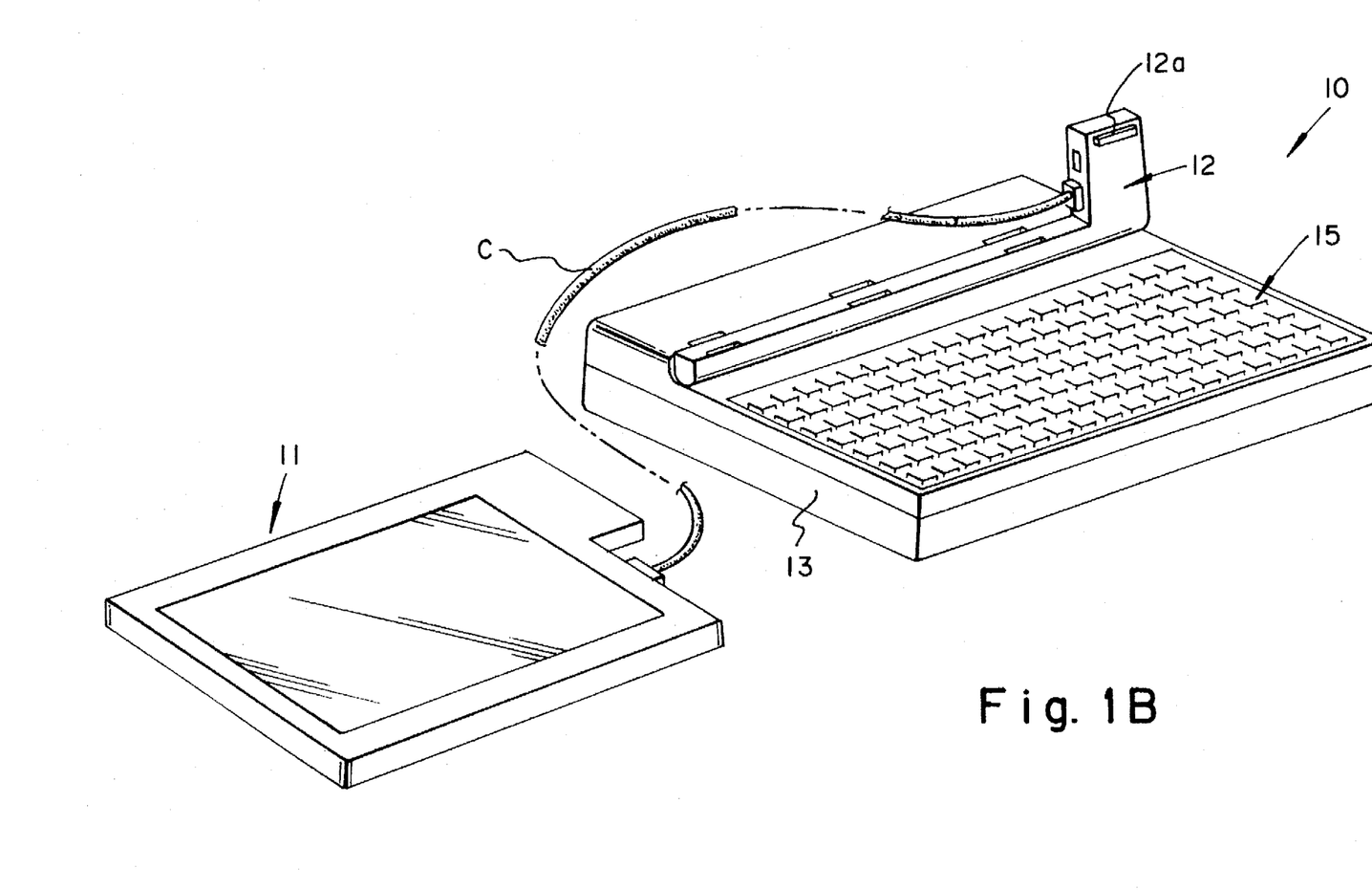
FIG. 1B is an adaptation of the personal computer of FIG. 1A in accordance with the invention.

In order to accommodate other positions of the module 11 that can be selected by the user, the invention provides for removing the module 11 from the mount 12 and interconnecting it to the mount by a cable C as shown in FIG. 1B. This allows the computer user to place the module 11 in any convenient position, for example horizontally in a plane parallel to that of the keyboard 15. This avoids the need for having the user look directly at the display 11 in the direction indicated by the arrow A in FIG. 1A. Instead, the user can position the display 11 alongside the keyboard 15, or in some other convenient position that is not restricted to the arc between the fully open and the fully closed position of the module 11 in FIG. 1A.

The display module 11 of FIG. 1B is configured for attachment to the hinged mount 12, and has an "L" shaped cutout where the cable C is attached as in FIG. 1B, or attachment is made to the hinged mount 12, as in FIG. 1A. The hinged mount 12 remains with the computer base 13 when the display module 11 is removed.

Figure 1C:
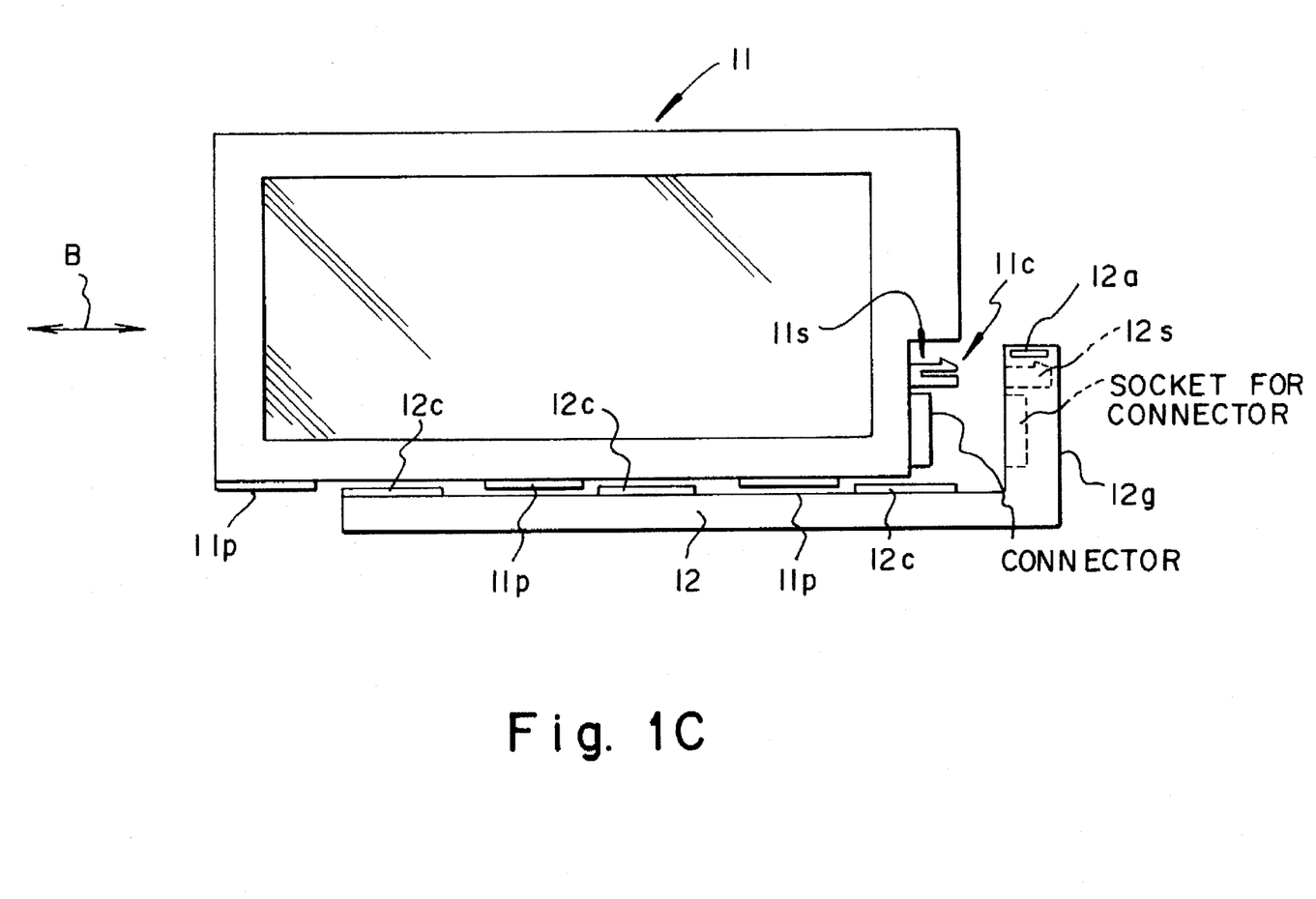
FIG. 1C is a view of the modular display of FIGS. 1A and 1B being removed from the hinged mount associated with the base unit of the computer.

In FIG. 1C the display module 11 is shown in the course of being disengaged from the mount 12 in preparation for attachment of the cable C and movement of the display 11 to another convenient location from which the cable C extends to the mount 12.

As indicated in FIG. 1C, there are illustratively three grooved channels 12c for guiding the display module 11 by projections 11p during removal of the module 11 preparatory to attachment of the cable C, or during engagement with the mount 12 when the module 11 is to be returned to direct connection with the mount. The projections lip can have a T-shaped cross-section, and the guide channels 12c can have C-shaped cross sections, so that the T-shaped projections fit snugly within the C-shaped channels.

The mount 12 has a vertical leg 12g, and "L" shaped cutout 11c of display module 11 complements the leg 12g, so that when the display module 11 is fully engaged with the mount 12 there is a unity combination, which is separated, when desired by the user, to achieve greater display flexibility.

Figure 1D:
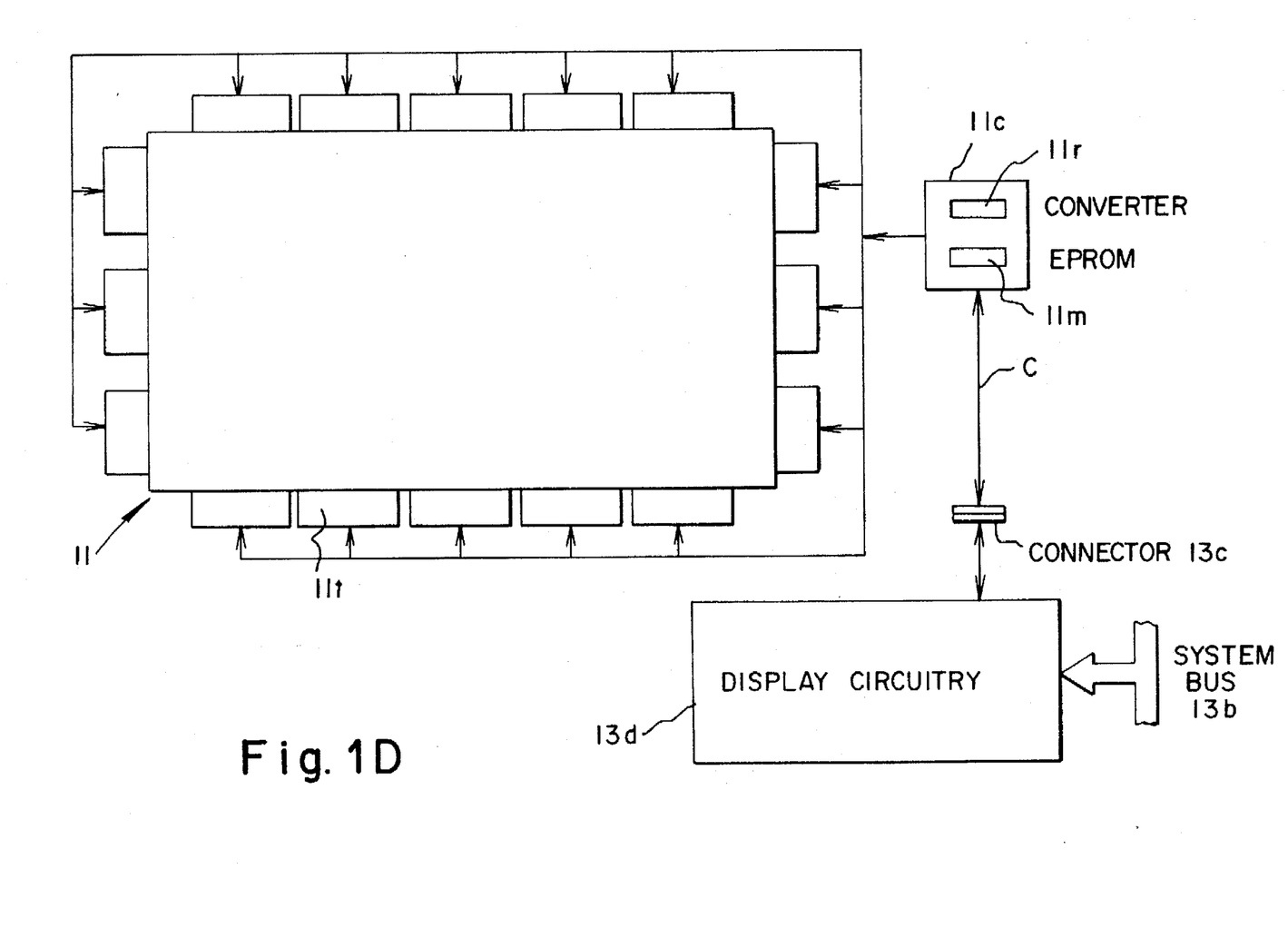
FIG. 1D is a block diagram showing the arrangement of components for initializing and operating the modular display FIG. 1B.

The relationship between control elements in the base unit 13 of the computer 10, and the display module 11, is shown in the block diagram of FIG. 1D. Display circuitry 13d is incorporated into the base unit 13, with connection to a system parallel bus 13b, to provide a path for necessary control signals. A multi-pin connector 13c permits connection to the control circuitry 13d for the cable C of FIG. 1B.

The display module 11 shown in FIG. 1D is a flat-panel with "tabs" 11t that incorporate logic for converting binary data communicated from the base unit 13 for crossed traces that activate the bit-array of the display module 11. Such a bit array can be formed by the 640 "horizontal" pixels (columns) and the 480 "vertical" pixels (rows) of Video Graphics Array (VGA) displays. A pixel is the smallest electrical unit on a display screen grid that can be stored, displayed or addressed. The VGA display was introduced by International Business Machines (IBM) in 1987 and has established a high resolution video display standard. VGA displays are provided with suitable wiring connections and signal requirements, including data format, for the base unit 13.

In the display module 11 provision is made for circuitry 11c, including an adjustable converter 11r and an Erasable, Programmable Read-Only Memory (EPROM) 11m for storing code signals associated with the operation of the display. The circuitry 11c is joined directly to the connector 13c in FIG. 1A, or by the cable C in FIG. 1B.

The converter 11r receives a direct power trace, or through the cable C, and provides output for adjustable contrast voltage and backlighting, which can be software controlled.

Suitable switches (not shown) may also be incorporated into the display module to make adjustments.

The EPROM 11m can be programmed with a unique identity code for the module 11. On initialization, a standard Basic Input/Output System (BIOS) of the computer 10 loads the correct programming routines, including necessary display driver routines, to operate that module 11. Typical control over the bit-map of the display module is by the flow of 8-bit serial data.

Figure 2A:
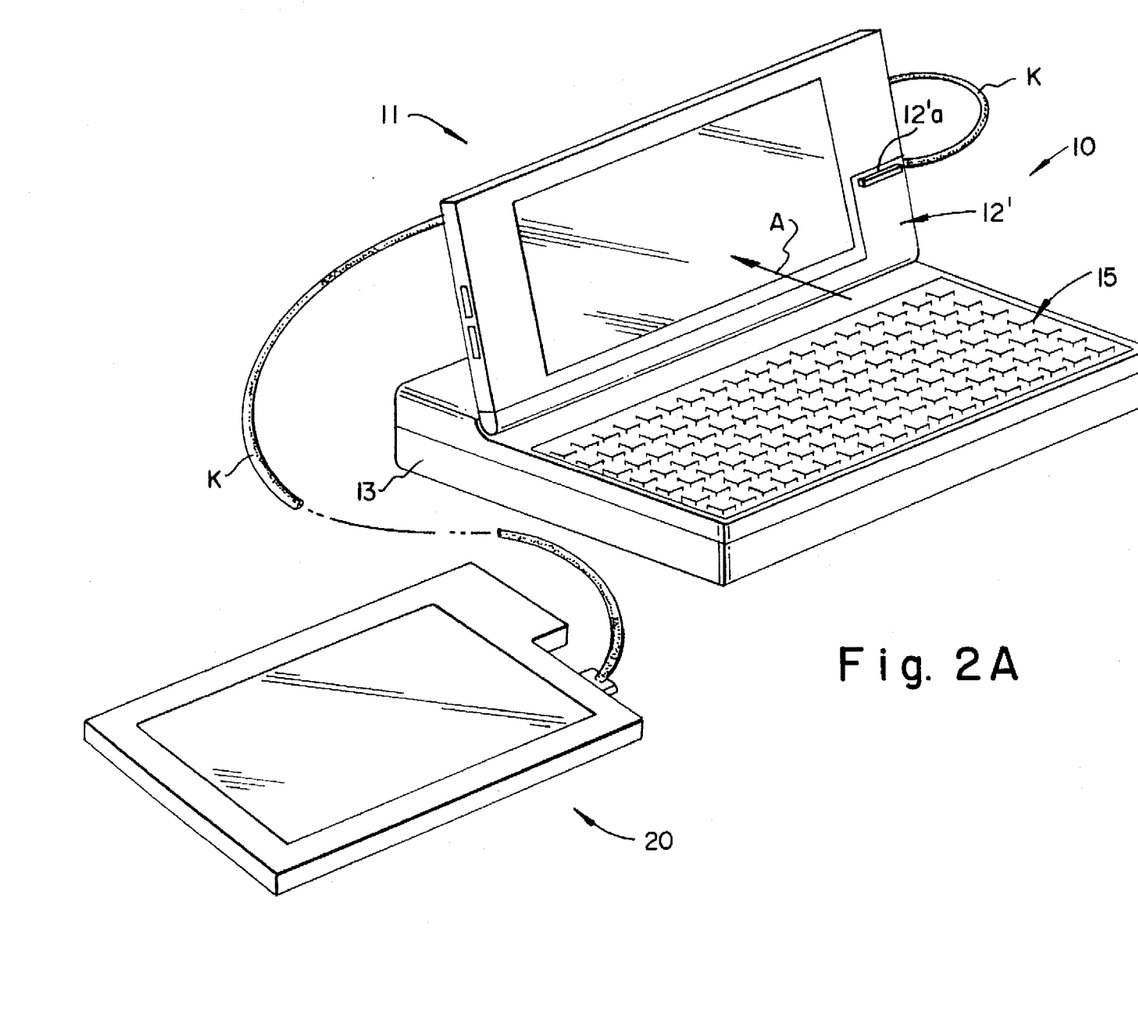
FIG. 2A is an adaptation of FIG. 1A for use with an auxiliary display in accordance with the invention.

With reference to FIG. 2A, the computer 10 of FIG. 1A can be adapted for use with an auxiliary display 20 in accordance with the invention. In this embodiment, the display 11 is retained in its original position on the mount 12', and is supplemented by the display 20. For that purpose the mount 12' is configured as shown in FIG. 2B, which is a partial perspective showing a modification in the mount 12 of FIG. 2A to accommodate the auxiliary display 20.

A snap-in structure 11s fixedly attached to display module 11 extends into cut-out area 11'c, and engages a slot 12's in the vertical portion 12'v of the mounting structure 12' when the display module 11 is fully engaged.

Figure 2B:
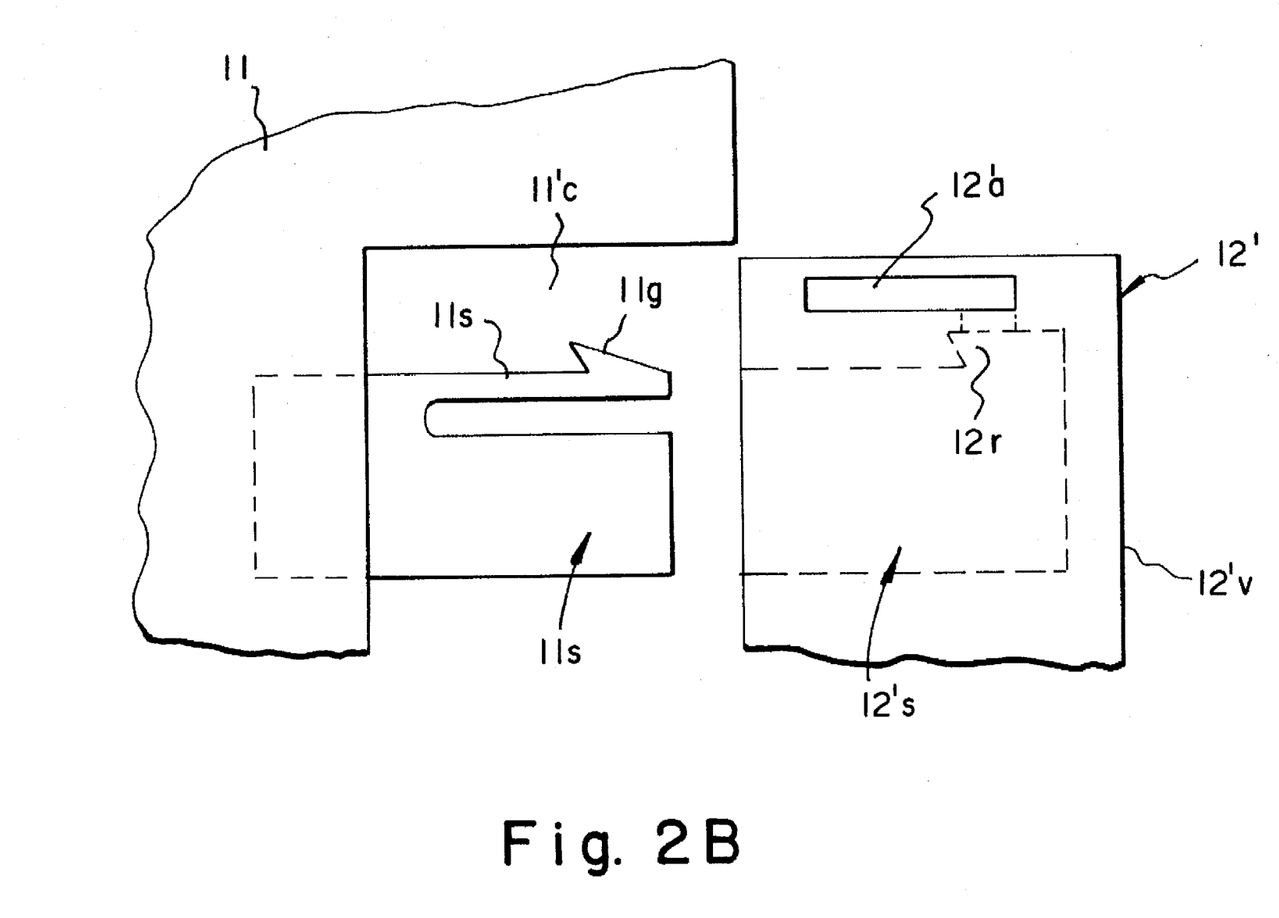
FIG. 2B is a partial perspective showing the modification in the hinge mount of FIG. 2A to accommodate the auxiliary display

FIG. 2B shows additional details of the snap-in structure 11s and the engagement slot 12's. The structure 11s can be injection molded from plastic, or made of any suitable material. The structure 11s includes a cantilever spring 11g with a snap-in shoulder. The receiving slot 12's has a shoulder 12r which engages the shoulder on the spring 11g. A spring-loaded button 12'a deflects the cantilever spring 11g when the button is depressed, allowing separation of the display module 11 from the mount 12'.

There is additionally a cable connector K that extends to the mount 12' and communicates with the control circuitry in the base 13 of the unit in the same fashion as for the panel 11.

In the embodiment of FIG. 2A, connection to the module 11 is made in standard fashion to a multi-lead terminal and a similar multi-lead terminal is used to provide connection to the cable K of the auxiliary display module 20. The electrical connectors have a multiplicity of lead terminals, for example, as many as 40 pins.

Figure 3:
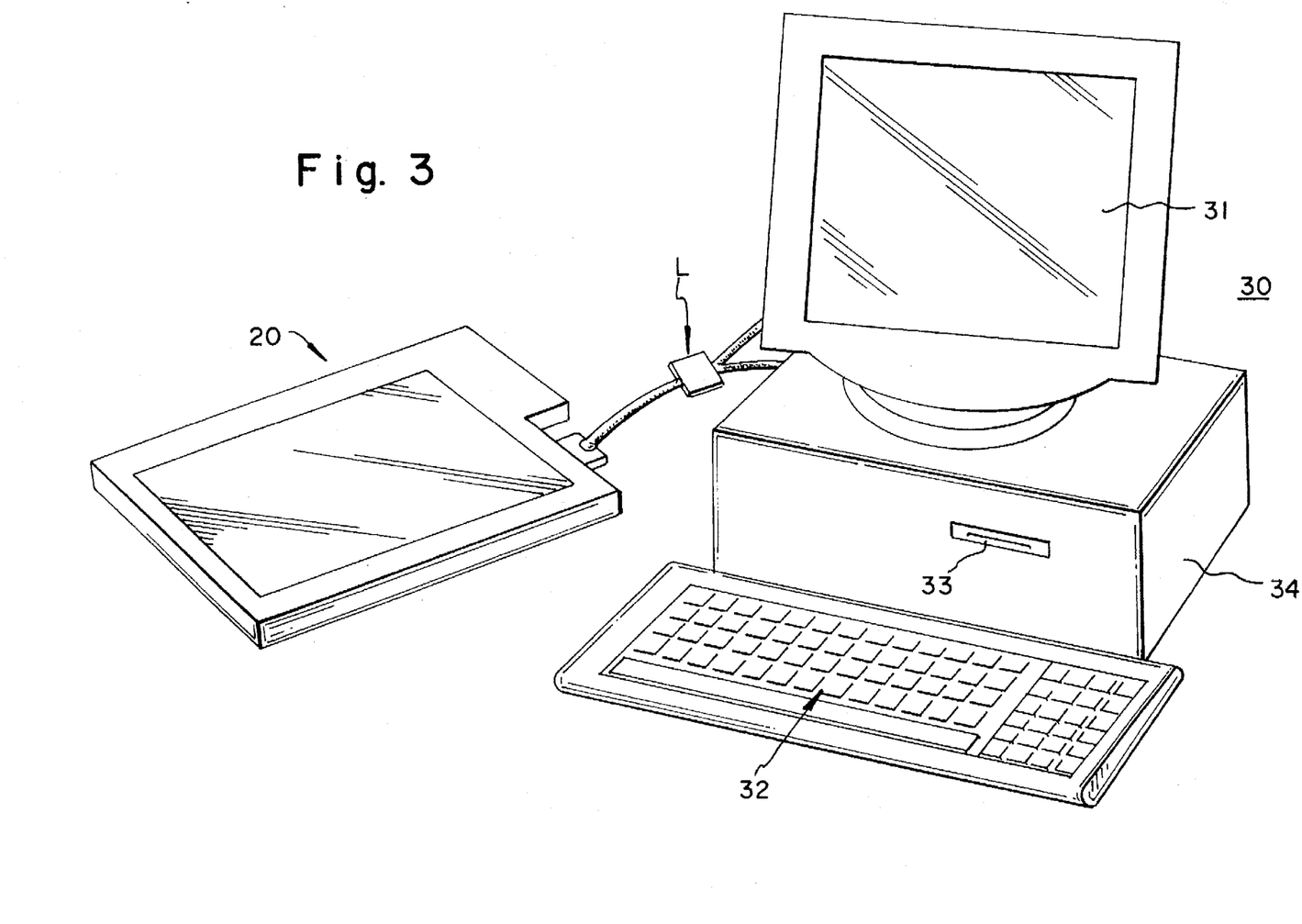
FIG. 3 is an adaptation of the auxiliary display of FIG. 2a for use along with a standard CRT display.

FIG. 3 is an adaptation of the auxiliary display module 20 of FIG. 2A for use in conjunction with a standard CRT display monitor 31 for the computer 30 which is configured in standard fashion with a keyboard 32 and other customary appendages including the disk insertion slot 33 in the base unit 34. The monitor 31 is connected to the base unit 34 in conventional fashion and a coupler L can be used to permit the base unit 34 to operate both the monitor 31 and the display module 20 simultaneously. This arrangement provides the user with extended facility in the use of the computer system 30 since the auxiliary display module 20 can be positioned in any convenient location with respect to the system 30. The coupler L is configured in standard fashion to achieve any necessary impedance matching.

Figure 4:
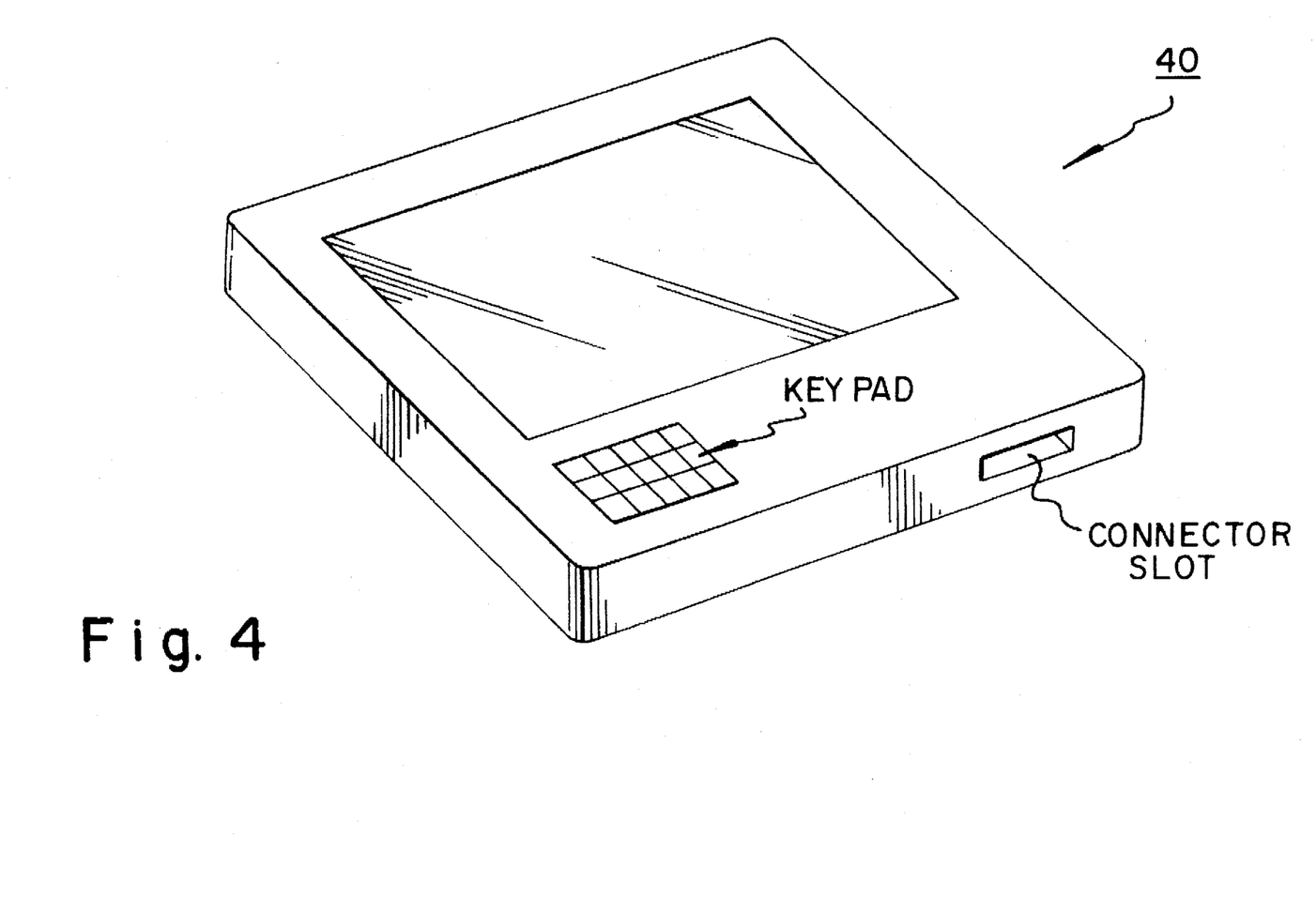
FIG. 4 is a perspective view of an auxiliary display in accordance with the invention adapted for use a portable data source.

FIG. 4 is a perspective view of an auxiliary display module 40 in accordance with the invention and adapted for use as a portable data source. This allows the user to transport the module 40, after being loaded with data, to any convenient location. In order to load the module 40, which can be similar in configuration to the module 11 of FIG. 1D, the circuitry 11c is configured with, for example, a Random Access Memory (RAM) which can be energized from any convenient terminal of the data source. A convenient data terminal includes the printer outlet of the source and the circuitry 11c is adapted accordingly. In addition, the module 40 is provided with suitable auxiliary features, including a rechargeable battery (not shown) and a key pad with the necessary connections for allowing the user to scroll and perform any other desired operations in relation to the module 40.

It will be understood that the foregoing detailed description is illustrative only and that numerous modifications and adaptations of the invention can be made by those of ordinary skill in the art without departing from the spirit and scope of the invention as defined in the appended claims and their equivalents.

Accordingly, there are many ways the circuitry can be arranged to implement the various functions of the display modules. Likewise, EPROMs and RAMs are convenient for storing data but other memory devices may also be used. In addition, there are a number of alternative arrangements for allowing engagement and disengagement of the display modules. Numerous other alterations will be apparent.

What is claimed:

1. The method of displaying information, comprising the steps of:
   (a) providing a flat-panel display module with display information from a source; and
   (b) separating said flat-panel display module from said source and locating said module, without being inverted, at a specified position physically displaced from said source;
   further including the step of operating said display module without connection to said source.

2. The method of claim 1 further including the step of transporting said display module away from said source to provide a portable data store.

3. The method of claim 1 further including the step of accessing said portable data store independently of said source.

4. The method of claim 1 further including the step of operating said flat-panel display with connection to said source and separated therefrom.

5. The method of claim 1 further including the step of positioning said module alongside a keyboard of said source.

6. The method of claim 1 further including the step of extending a cable from said flat-panel module to a hinged mount of said source.

7. The method of claim 1 further including the step of back lighting said display module.

8. The method of claim 1 wherein said flat-panel module is slidably engageable on said source;
   thereby to permit said module to be slidably disengaged from said source and positioned at a location physically displaced from said source.

9. The method of claim 1 including the step of operating said display simultaneously with another flat-panel display.

10. The method of claim 1 further including the step of operating said display simultaneously with a non-flat-panel display.

11. Apparatus comprising
    a flat-panel display module;
    means for storing display information in said module;
    means for disconnecting said module from the storing means while preserving the display information stored therein.

12. Apparatus comprising
    A flat-panel module connected to a source of information for original form display of said information;
    means for disconnecting said display module from said source with continued original form display of said information.

13. Apparatus as defined in claim 12 further including means for controlling the display of said stored information by said module independently of said storing means.

14. Apparatus as defined in claim 12 wherein said display module includes a rechargeable battery.

15. Apparatus as defined in claim 12 wherein said display module includes a keypad.

* * * * *